United States Patent [19]
Dobler

[11] Patent Number: 5,919,414
[45] Date of Patent: Jul. 6, 1999

[54] LABEL INSERTING METHOD AND APPARATUS

[75] Inventor: Walter Dobler, Bad Urach-Seeburg, Germany

[73] Assignee: Systec Engineering Knauer GmbH & Co. KG, Bad Urach, Germany

[21] Appl. No.: 08/765,137

[22] PCT Filed: Jun. 27, 1995

[86] PCT No.: PCT/EP95/02505

§ 371 Date: Mar. 10, 1997

§ 102(e) Date: Mar. 10, 1997

[87] PCT Pub. No.: WO96/02378

PCT Pub. Date: Feb. 1, 1996

[30] Foreign Application Priority Data

Jul. 15, 1994 [DE] Germany .............................. 44 25 139

[51] Int. Cl.⁶ .............................. B29C 51/16; B29C 45/14
[52] U.S. Cl. .......................... 264/511; 264/509; 264/155; 264/259; 425/503; 425/504; 425/126.1; 425/129.1
[58] Field of Search ................................... 264/509, 155, 264/259, 511; 425/503, 504, 126.1, 129.1

[56] References Cited

U.S. PATENT DOCUMENTS

| | | | |
|---|---|---|---|
| 3,292,209 | 12/1966 | Borkman | 264/509 |
| 3,324,508 | 6/1967 | Dickinson | 264/509 |
| 4,335,635 | 6/1982 | Hautemont | 264/509 |
| 4,824,630 | 4/1989 | Mohney . | |
| 4,880,369 | 11/1989 | Kaminski | 425/504 |
| 5,082,439 | 1/1992 | Kaminski | 425/504 |
| 5,344,305 | 9/1994 | McKillip | 425/503 |
| 5,614,146 | 3/1997 | Nakamura et al. | 264/509 |

FOREIGN PATENT DOCUMENTS

| | | |
|---|---|---|
| 0 421 641 A3 | 4/1991 | European Pat. Off. . |
| 2 454 970 | 11/1980 | France . |
| 2 606 701 | 5/1988 | France . |
| A 62-196113 | 8/1987 | Japan . |
| A 06-063988 | 3/1994 | Japan . |
| 1 357 531 | 6/1974 | United Kingdom . |

*Primary Examiner*—Catherine Timm
*Attorney, Agent, or Firm*—Burns, Doane, Swecker & Mathis, L.L.P.

[57] ABSTRACT

The present invention relates to a method for providing at least one insertion label on a tool of a machine, the insertion label being insertable into a mold half of a tool of a plastics processing machine, in particular injection molding machine or deep-drawing machine. In this method insertion labels are punched out of label web material by means of a punching device consisting essentially of a punching plate and a cutting tool. The insertion labels are transferred by a carrier, which belongs to the punching device, to the tool of the machine and are discharged for insertion thereinto. So far a great problem has consisted in performing such a transfer in such a manner that the insertion label is positioned in a sufficiently precise manner without creases. This problem is overcome in that after the punching operation the insertion labels are held by the punching plate which is movable substantially in a direction transverse to the punching direction and formed as a carrier, and are transferred to the tool of the machine. Furthermore, the present invention relates to an apparatus for performing the method.

22 Claims, 8 Drawing Sheets

LABEL INSERTING METHOD AND APPARATUS

The present invention relates to a method for providing at least one insertion label on a tool of a machine, the insertion label being insertable into a mold half of a tool of a plastics processing machine, in particular an injection molding machine or deep-drawing machine, and the insertion labels being punched out of label web material by means of a punching device consisting essentially of a punching plate and a cutting tool, and being transferred by a carrier, which belongs to the punching device, to the tool of the machine and being discharged for insertion thereinto. Furthermore, the invention relates to an inserting apparatus, especially for performing the method.

EP-A-0 249 363 discloses a method and an apparatus for providing insertion labels on an injection molding machine. As described in this publication, label web material is wound from a supply reel and guided over a cutting tool of a punching press, and the coherent residual punching material is wound up by another reel. The punching plate has mounted thereon an extension arm which is pivotably supported about an axis. After the punching plate has been pressed onto the cutting tool and after the insertion labels have been punched out from the web material, the cutting tool is moved out of its punching position into a transfer position. In the transfer position the insertion label is received by a carrier provided with a suction device and is inserted into the open space between the opened mold halves of the tool of the injection molding machine and is discharged to the mold cavity. The method and the apparatus have the disadvantage that directly after the punching process the insertion label rests on or between the cutting edges of the cutting tool and that the insertion label thereby assumes a relatively undefined position in the transfer position.

This is due to the fact that the cutting blades of the cutting tool are smaller on their cutting edge than at their base, so that the insertion label will never lie flat on the cutting tool. As a consequence, the insertion label will not be sucked in the transfer position in a uniform manner by the suction means of the carrier, which will possibly lead to the formation of creases and an inaccurate positioning of the insertion label. It should here be noted that it is important to introduce the insertion labels with utmost precision into the mold cavity when plastic containers are made using insertion labels inserted into the mold cavity. This has the effect that the insertion label must be fed with positional accuracy and without creases right from the beginning.

It is therefore the object of the present invention to implement a method for providing insertion labels on a plastics processing machine, wherein the insertion labels can be supplied with utmost precision and positional accuracy and without creases to the tool portion of the machine. Another object of the present invention is to provide an inserting apparatus for such a purpose.

In the method, this object is achieved according to the invention in that after the punching process the insertion labels are held by the punching plate which is substantially movable in a direction transverse to the punching direction and formed as a carrier and are transferred to the tool of the plastics processing machine. A positionally accurate removal of the insertion labels from the cutting tool without creases is possible by using the normally large-surface and plane punching plate as a carrier, so that the insertion labels can be supplied to the tool of the injection molding machine in a correspondingly precise manner. Furthermore, this invention has the advantage that in comparison with the prior art the cutting tool can now perform further punching operations by using additional punching plates, so that the simultaneous supply of a plurality of plastics processing machines, in particular injection molding machines, would be possible.

The insertion labels can be held on the punching plate in the simplest way in that during the punching operation and the transfer to the tool of the injection molding machine the insertion labels are tightly sucked onto the punching plate. The transfer in the area of the tool of the plastics processing machine can then only be performed by simply deactivating the suction.

To insert the insertion labels from the normally plane punching plate with fitting accuracy into a three-dimensional mold cavity, the insertion labels on the tool of the plastics processing machine can be transmitted to an insertion unit which inserts each of the insertion labels into a mold half and discharges them thereto.

If in another embodiment the insertion labels are discharged by a transfer unit from the punching plate and fed onto the insertion unit, it suffices when the punching plate just performs a straight movement for transferring the insertion labels. The transfer to the insertion unit which most of the time takes place in another plane and at another angle can then be performed in an advantageous manner by a correspondingly constructed transfer unit.

Especially with the production of cylindrical or frusto-conical containers, the insertion labels can be moved tangentially by the transfer unit to the insertion unit. As a result of this measure, it is possible to deposit the insertion labels with accuracy as to shape by a rotation or by a linear movement of the insertion unit.

Moreover, the method makes it possible to punch out a plurality of insertion labels at the same time and to transfer them from the punching plate to the tool of the plastics processing machine and to discharge them for insertion into the tool. With the method of the invention, it is also possible to supply tandem tools, in particular, of injection molding machines, with a correspondingly large number of insertion labels at the same time.

Furthermore, the present invention relates to an inserting apparatus for providing at least one insertion label which can be inserted into a mold half of a tool of a plastics processing machine, especially injection molding machine or deep-drawing machine, the apparatus comprising a punching device which consists essentially of a punching plate and a cutting tool and is used for punching the insertion labels out of label web material, and a carrier which is assigned to the punching device and which transfers the insertion labels to the tool of the machine and discharges them for insertion thereinto. The apparatus is especially characterized in that the carrier is formed by the punching plate which is arranged to be movable in a direction transverse to the punching direction and which is provided with holding units for holding the insertion labels. In contrast to the prior art in which it is not possible to transfer an insertion label which is positioned in plane fashion, insertion labels can be positioned with the aid of this apparatus with high precision to be introduced into the tool of a plastics processing machine.

It is here advantageous when the punching plate is arranged on a slide which can be moved back and forth between punching device and a discharge position near the tool of the injection molding tool. If demanded by various sizes of insertion labels, the slide of the inserting apparatus can be retrofitted without considerable efforts just by exchanging the punching plate.

An especially simple guidance means of the slide can be attained in that the means is movably guided on at least two guide bars which are substantially parallel.

The guide bars can each predetermine the desired path for moving the slide in space. A slide can be guided on guide bars, especially by way of rolling element guides, at very low friction.

An especially rapid displacement of the slide and thus the approach of insertion labels within a relatively short clock time can be achieved in that the slide is movable by a high-speed drive, especially a strip-type cylinder-drive or servo drive. Such a drive makes it possible to feed the insertion label at the conventional distances of cutting tool and tool of the injection molding machine within the fraction of a second.

The punching forces can thereby be received in an improved manner in that the punching plate is movable relative to the slide in the punching direction against a restoring force. Furthermore, contact on the cutting tool can thereby be extended in time and it is thus possible to assign more time to the suction of the insertion labels.

It is especially advantageous when the punching device includes an eccentric press or hydraulic cylinder or pneumatic cylinder which exerts a force at a predetermined clock on the punching plate in the punching direction and presses the plate onto the cutting tool. Eccentric presses are simple in construction and relatively inexpensive as to their purchasing cost. When hydraulic cylinders or pneumatic cylinders are used, it is possible to resort to hydraulic and/or pneumatic connections already present on the plastics processing machine.

An especially simple constructional solution for acting on the punching plate in a uniform manner by the press and with a force is—although the slide may be arranged thereinbetween—that the slide comprises openings through which during the punching operation the press bolts of the press can be introduced in punching direction for contact with and movement of the punching plate. Hence, the press bolts are only within the openings during the punching operation, so that a lateral movement of the slide is subsequently possible without impediment. The holding units of the punching plate are advantageously formed by suction elements, for instance, in the form of suction ports. This kind of holding unit normally operates without wear and in a reliable manner and with positional accuracy.

In another embodiment an insertion unit which receives the insertion labels and inserts them into a mold half of the tool and discharges each thereto can be provided in the area of the tool of the plastics processing machine. On account of the additional insertion unit, the punching plate must only perform relatively simple displacement movements since the insertion of the insertion labels into the space between the mold halves is performed by the insertion unit.

It is here of great advantage when the insertion unit is formed as a suction-type holding mandrel. Reference is here made to the German patent application P 4 141 645. The mechanism of such a suction-type holding mandrel and the advantages thereof are already described in detail in the application.

The placing of the insertion labels onto the insertion unit can be simplified in that a transfer unit which takes over the insertion labels from the punching plate and discharges them substantially with positional accuracy to the insertion unit is arranged between insertion unit and punching plate in the discharge position thereof. Therefore, the punching plate and the insertion unit need only perform simple movements. When the insertion unit is formed as a suction-type holding mandrel, the already known motional sequence of such an apparatus need not be changed, since the corresponding transfer movement from the punching plate to the insertion unit is performed by the transfer unit.

To this end, the transfer unit is advantageously driven in a displaceable manner substantially in a direction transverse to the punching plate. As a consequence, the punching plate need not be moved directly into the space between the mold halves of the tool. The movement of travel of the punching plate is thereby simplified once more.

To place the insertion labels with accuracy, as to shape and also with fitting accuracy on the insertion units which are adapted to respectively defined containers, the transfer unit may have a pivot head for pivotably receiving the insertion labels. As a result, it is possible to discharge the insertion labels to the insertion unit in almost all positions and angular locations.

In a constructionally very simple manner, the pivot head can also comprise suction ports which ensure an accurate contact of the insertion labels.

The insertion labels can be provided in an efficient manner in that the punching plate includes a plurality of receiving portions for simultaneously punching and receiving a plurality of insertion labels. The provision of a plurality of insertion labels, in particular on injection molding tools that have a plurality of mold cavities, is not given by such an embodiment.

To keep the punching loss in the web material relatively small, and also to operate, in particular, injection molding tools that have sequentially arranged multiple molds, the receiving portions may be arranged relative to each other on the slide such that they are displaceable, thereby assuming their predetermined position during the punching operation and in the discharge position according to the cutting tool and the respectively assigned transfer unit and/or the respectively assigned insertion unit. This means that in the course of punching the receiving portions may assume a very close position relative to each other whereas in their discharge position they can be positioned on the tool of the plastics processing machine at a correspondingly remote distance from one another so as to supply, for instance, multiple injection molding machines in a process with a specific number of insertion labels.

Embodiments of the present invention shall now be explained in more detail with reference to a drawing in which.

A first embodiment of the present invention shall now be described in the following with reference to FIGS. 1 through 6. The inserting apparatus according to the invention includes, for instance, a punching device 1 which is laterally arranged on an injection molding machine 2. Punching device 1 includes a frame 3 consisting of first and second base plates 5, 6 (See FIG. 5) that are spaced apart from each other by way of columns. The first base plate 3 is secured to a housing 7 of the injection molding machine 2 (See FIG. 3), whilst the second base plate 6 has arranged thereon a drive 8 of an eccentric press 9. Eccentric press 9 includes bearing blocks 10 which are secured to the second base plate and in which an eccentric shaft 11 is rotatably supported. Connecting rods 12 which are articulated to the end of the eccentric shaft 11 extend through passages 13 in the second base plate 6 into the space between the two base plates 5, 6. A press plate is articulated to the free end of the connecting rods 12 and can be laterally guided to perform guided upward and downward movements (not shown in the drawings). A plurality of press bolts 15 which are substantially aligned in pressing direction are arranged on the press plate at the side facing away from connecting rods 12. Furthermore, punching device 1 comprises a punching plate which is arranged on a slide 16 and which is substantially aligned in vertical direction relative to the punching direction. The connecting elements 18 between punching plate 17 and press plate 14 permit a displacement of the punching plate 17 in the punching direction against a restoring spring force. A cutting tool 19 which is preferably formed by a steel-strip cutting tool is mounted on the first base plate 5 of the punching device 1. The cutting tool 19 can preferably be moved against a spring force also in the punching direction. Slide 16 has a plurality of openings 20 into which press bolts 15 can be introduced in the punching position and pressed onto the back side of the punching plate 17, so that the plate is moved by the spring force on account of the correspondingly formed connecting elements 18 thereof and is pressed onto cutting tool 19. In the retracted position of the eccentric press 9, press bolts 15 are no longer located in openings 20 of slide 16.

Figure 3:
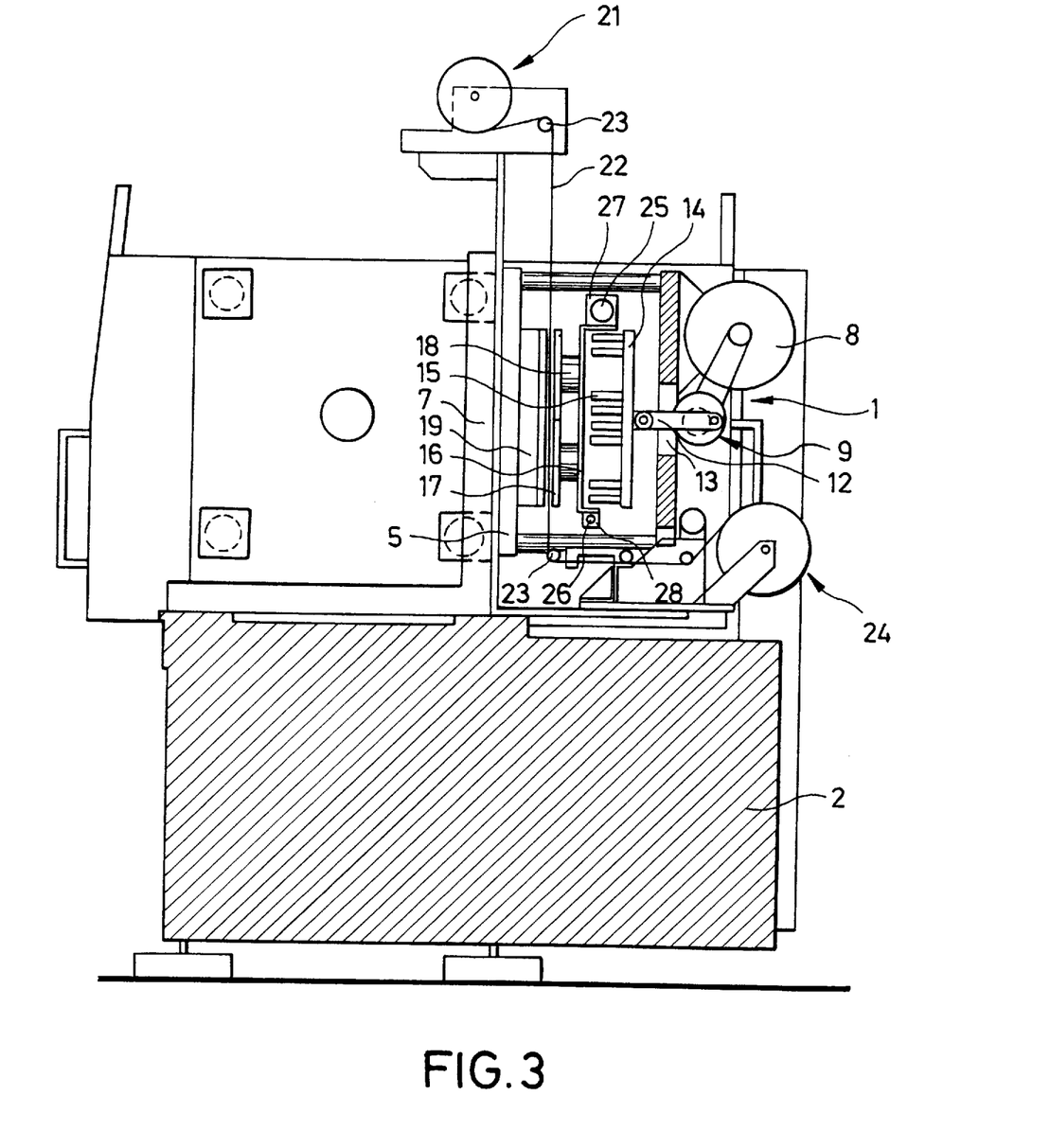
FIG. 3 is a schematic sectional view of the illustration of FIG. 1 taken along line III—III.

Turning now to FIG. 3, a supply roll 21 from which label web material 22 is wound is rotatably arranged above the punching device 1. The web material 22 is guided via deflection rollers 23 substantially in parallel with punching plate 17 and cutting tool 19 between said members and is again wound via deflection rollers 23 by a discharge roll 24 which winds the coherent residual punching material, or is directly supplied to a comminuting device.

Figure 1:
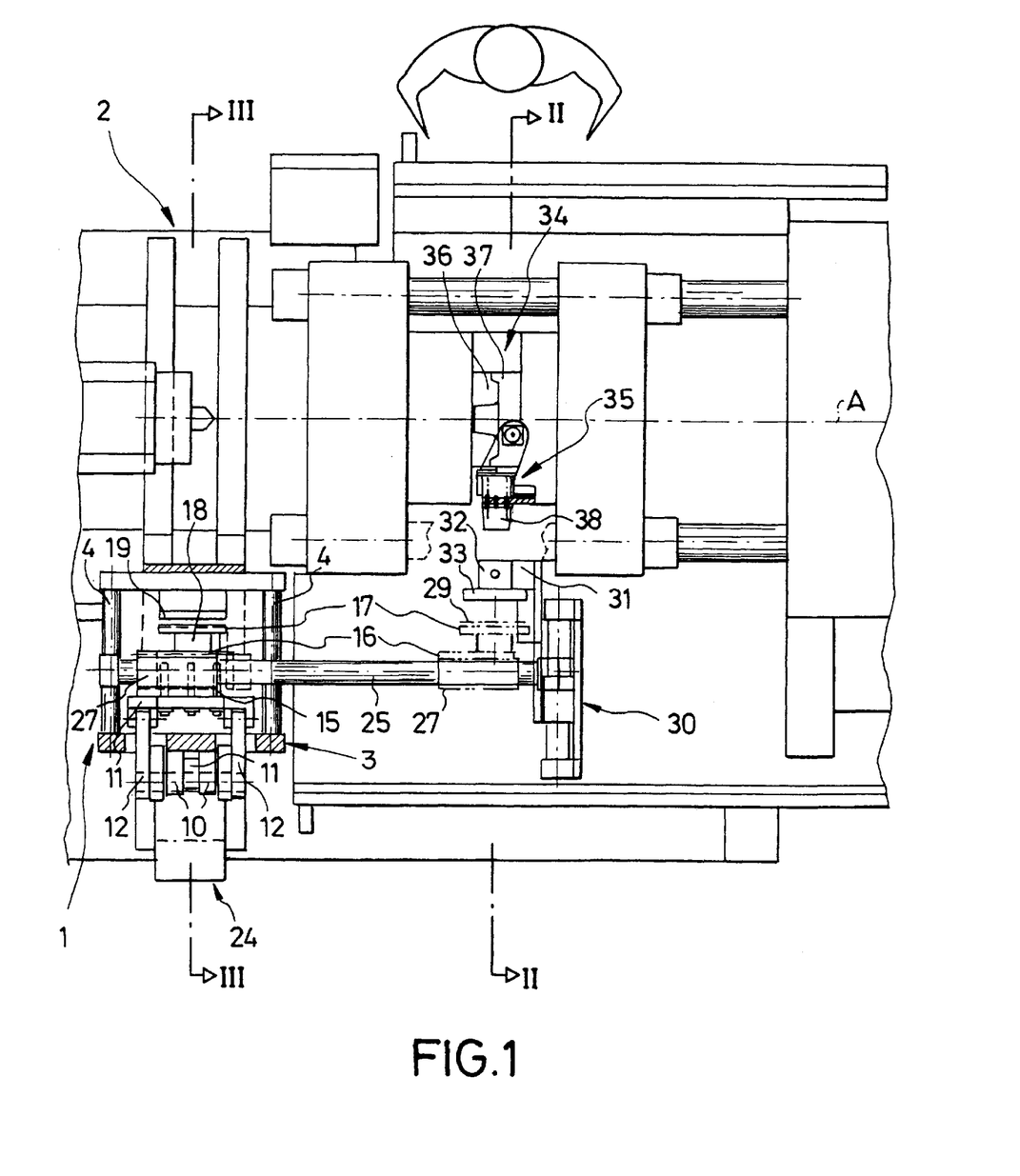
FIG. 1 is a partial top view of an injection molding machine in which the inserting apparatus of the invention is mounted.
Figure 4:
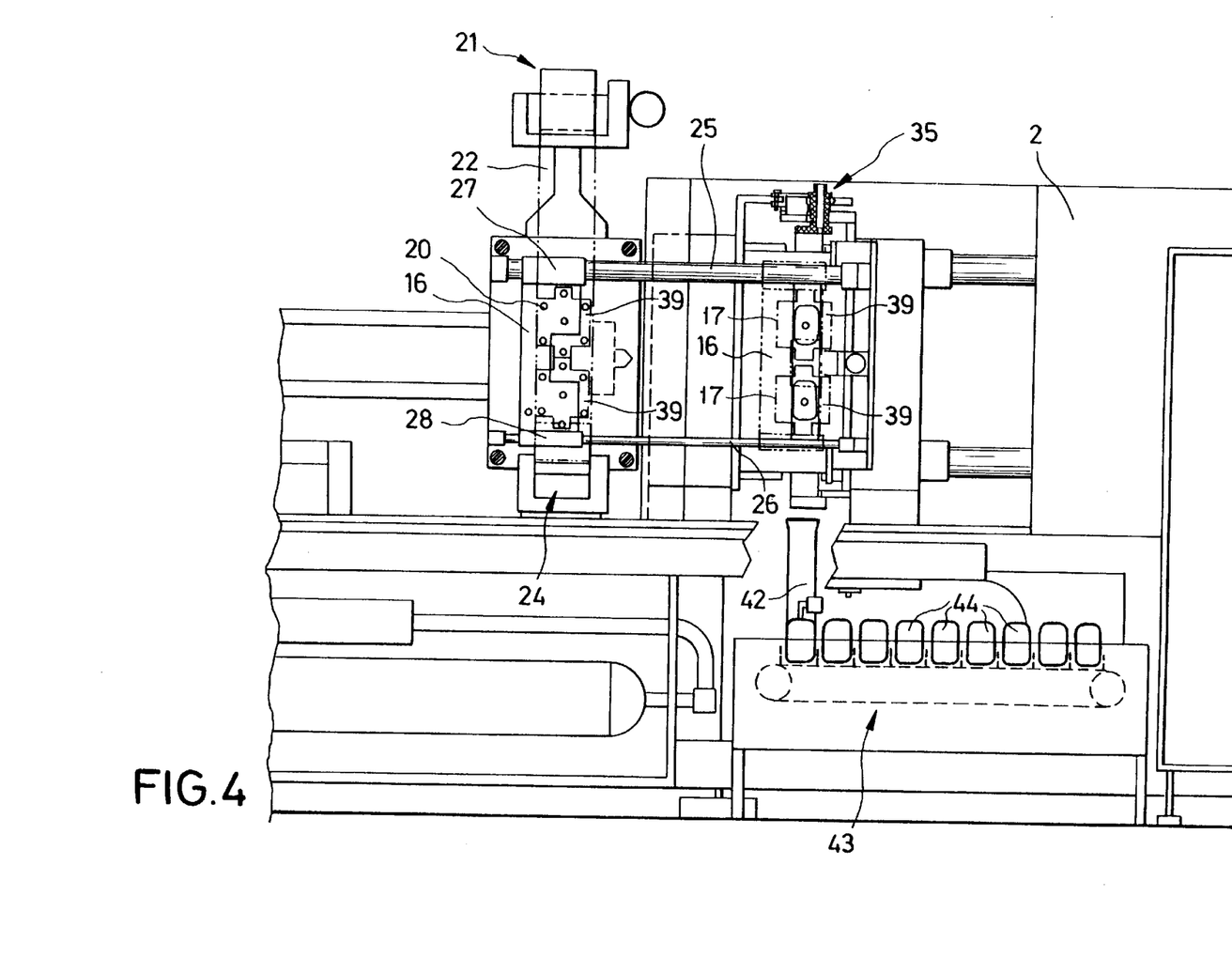
FIG. 4 is a lateral view of the illustration of FIG. 1.
Figure 5:
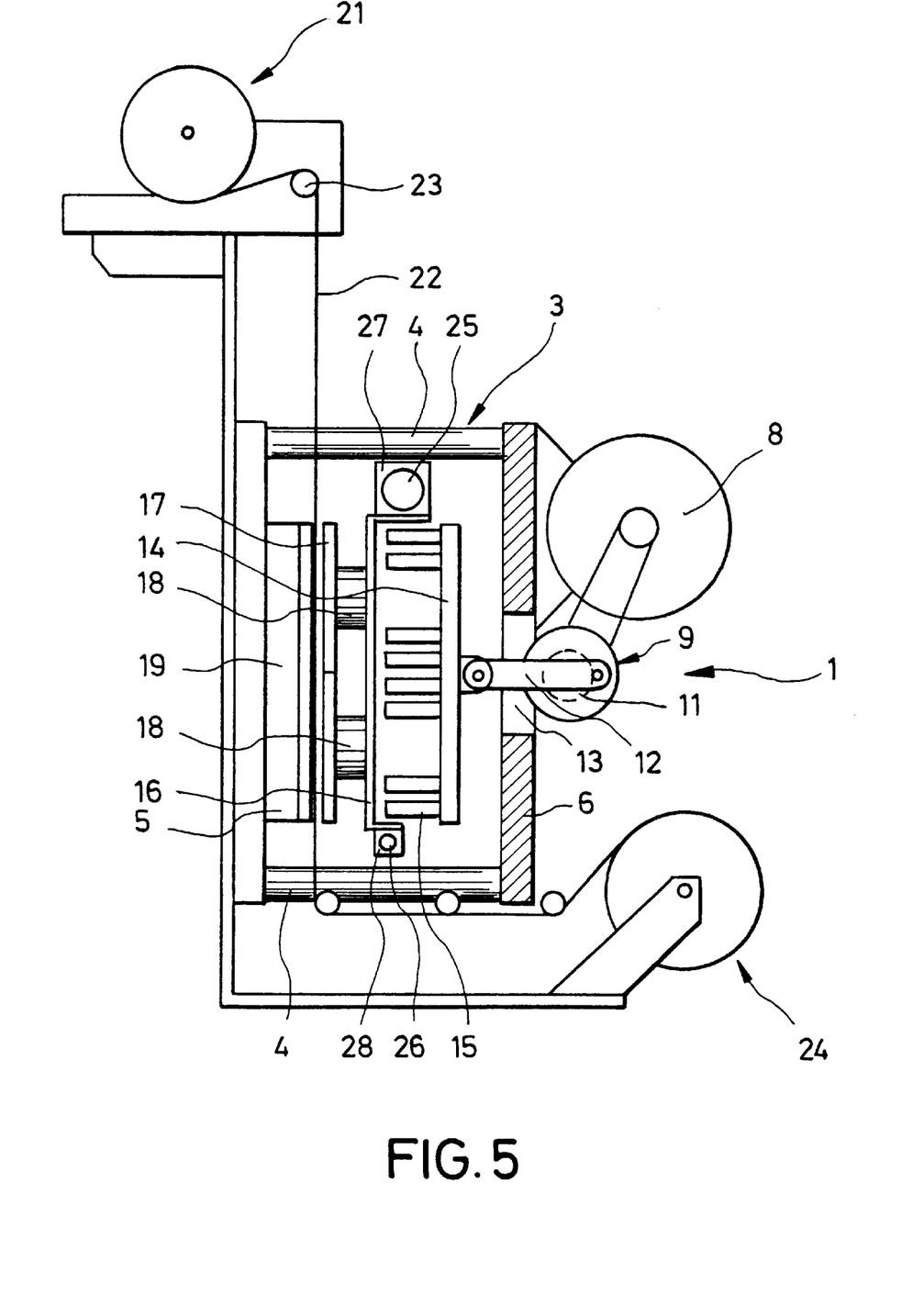
FIG. 5 is a schematic view of the punching device in an enlarged sectional representation.
Figure 6:
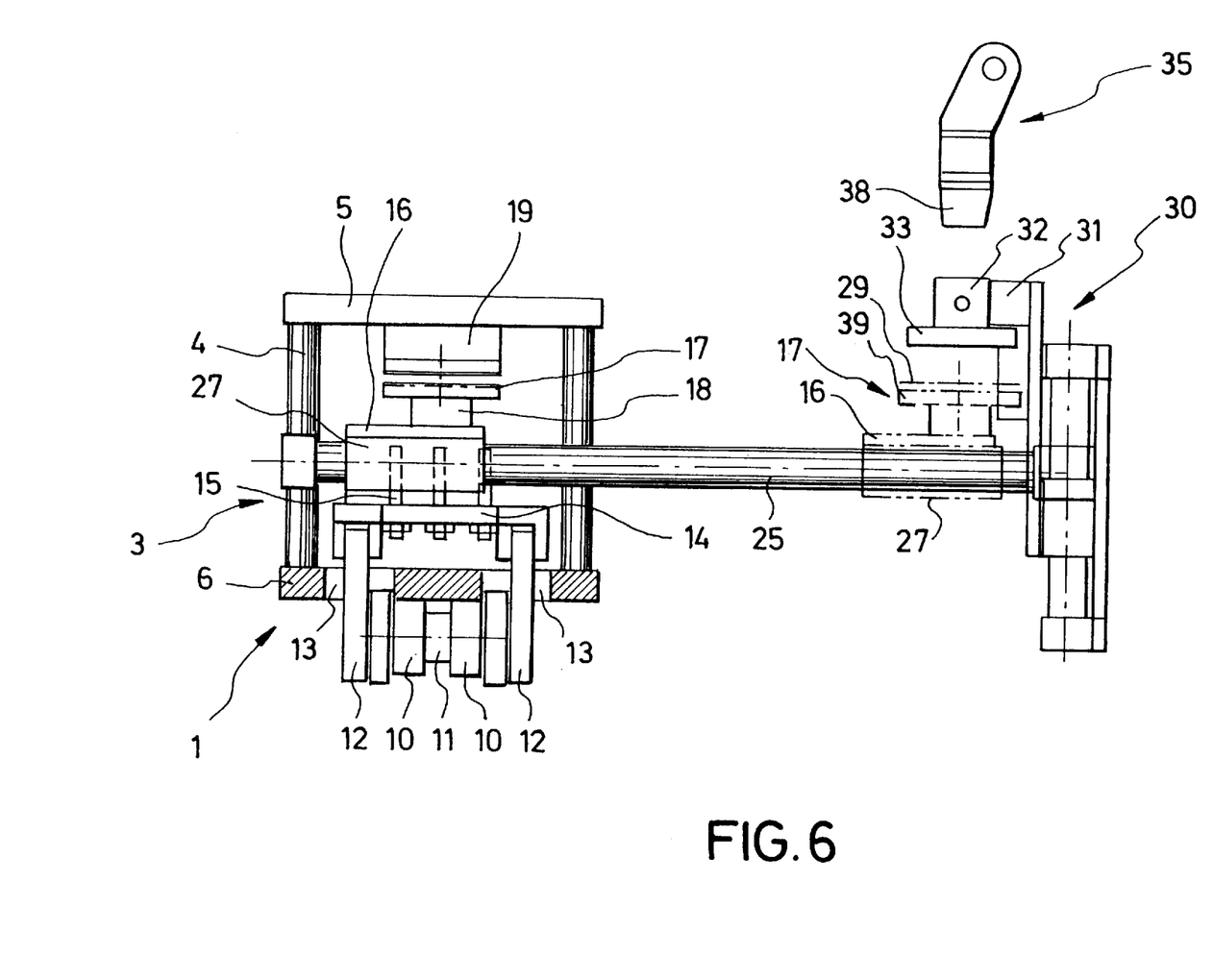
FIG. 6 is a top view on the inserting apparatus of the invention.

As can especially be seen in FIGS. 1 and 4, slide 16 can be displaced on upper and lower guide bars 25, 26 in a direction transverse to the punching direction. To this end, the upper and lower ends of slide 16 have provided thereon corresponding upper and lower guide bushes 27, 28 which grip around the cylindrical guide bars 25, 26 substantially with fitting accuracy. Guide bars 25, 26 are aligned in parallel with each other and extend preferably substantially in parallel with the machine axis A of the injection molding machine 2. Guide bars 25, 26 are secured at one side to columns 4 of punching device 1 and at the opposite side to the injection molding machine 2. Corresponding rolling element guides can respectively be arranged between guide bushes 27, 28 and guide bars 25, 26 for reducing the friction. Slide 16 is preferably moved, normally via the upper guide bush 27 by a high-speed drive, preferably a strip-type cylinder drive, from the punching position into a discharge position illustrated in FIG. 1 with a two-dotted broken line. Such a drive (not shown) permits a positionally accurate displacement of slide 16 from one position into the other position within fractions of seconds. The punching plate 17 comprises holding elements (not shown), preferably in the form of suction ports by which insertion labels 29 punched out of the label web material 22 are precisely positioned in a retainable manner on punching plate 17.

In the area of the discharge position of punching plate 17, there is arranged a transfer unit 30 (See FIGS. 1,2,6 and 7) which is substantially composed of a displacement arm 31 which is movable in a direction transverse to the punching plate 17, and of a pivot head 42 which is arranged at the end of displacement arm 31 and includes a receiving plate 33 for receiving insertion labels 29. Pivot head 32 can be pivoted about one or a plurality of axes on displacement arm 31. Displacement arm 31 can be moved, for instance, by means of a pneumatic or hydraulic drive. Pivot head 32 comprises suction connections (not shown) provided on receiving plate 33, which serve to receive and discharge the insertion labels.

In the extended state, the displacement arm 31 is positioned in the area of tool 34 of the injection molding machine 2. An insertion unit 35 shaped in the form of a suction-type retaining mandrel which simultaneously fulfills two functions when the two mold halves 36, 37 of tool 34 are opened is also arranged in this area. On the one hand, an insertion label 29 is inserted by the insertion unit 35 into the mold cavity of tool 34 and, on the other hand, the workpiece previously finished by injection molding is removed from the mold core. This insertion unit 35 is pivotably arranged on the injection molding machine 2, so that in the closed state of tool 34 the receiving portion 38 laterally projects in the direction of the transfer unit 30. Suction ports are provided on the outer circumference and possibly on the front surface of insertion unit 35. An exact description of these insertion units is given in detail in German patent application P 4 141 645.

Figure 2:
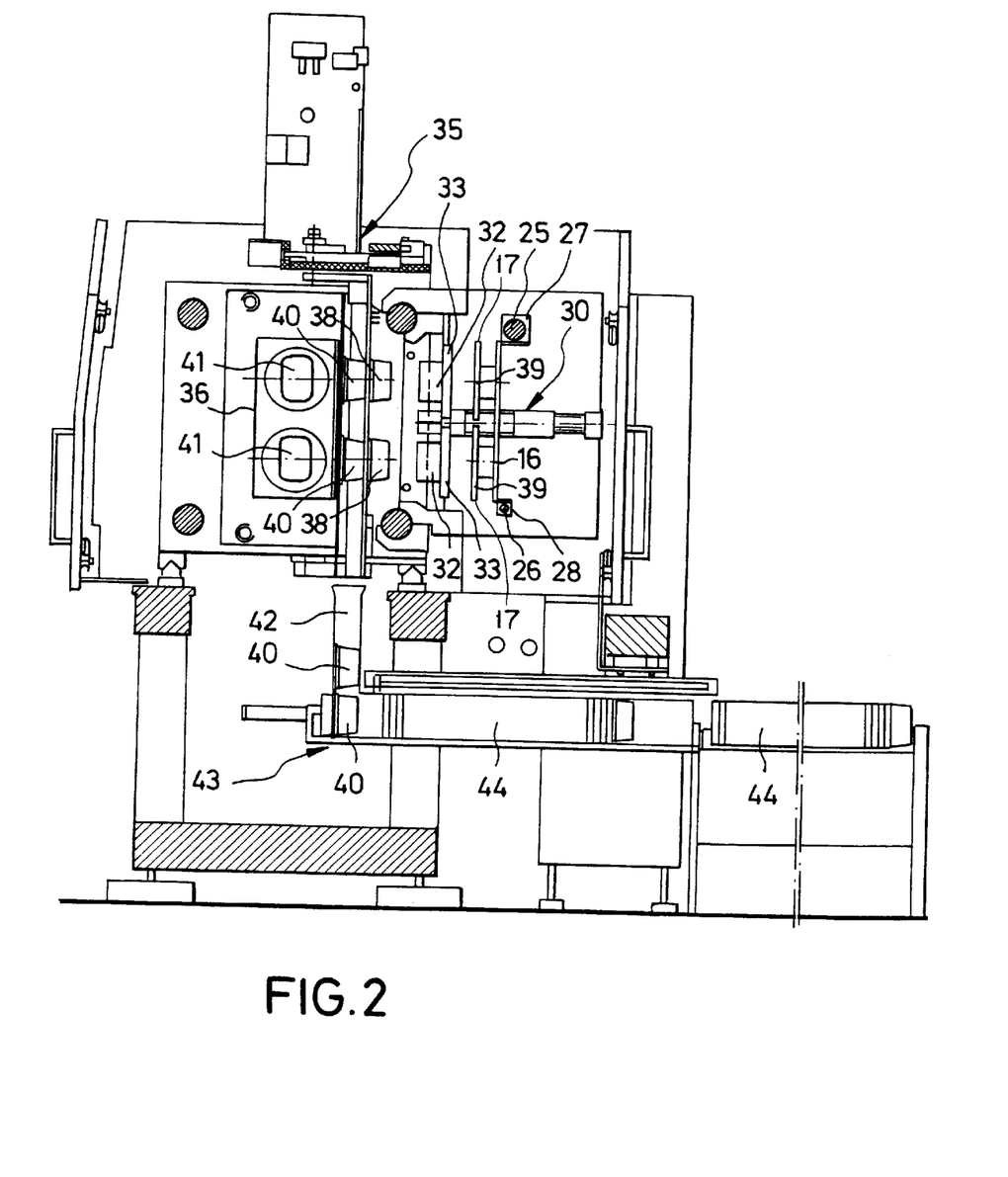
FIG. 2 is a schematic sectional view of the illustration of FIG. 1 taken along line II—II.

As can especially be seen in FIGS. 2 and 4, the punching plate 17 comprises two receiving portions 39 that can each receive an insertion label 29. The receiving portions 39 can be displaced laterally within a defined range, so that they are as close as possible to each other in the punching direction and are moved apart in the discharge position to facilitate the transfer to transfer unit 30. This displacement has the further advantage that the insertion labels 29 can already be aligned relative to the corresponding height of the mold cavities in tool 34, so that this path of displacement need not additionally be traveled by transfer unit 30.

The mode of operation of the present invention shall now be explained in more detail:

Insertion labels 29 are punched out of the label web material 22, which is guided through the punching device 1, owing to the rotational movement of the eccentric press 9 by pressing press bolts 15 onto the resiliently supported punching plate 17. The same plastic material as is used for finishing the container by injection molding is preferably employed as a web material 22 for the insertion labels 29. Press bolts 15 are preferably arranged on press plate 14 in such a uniformly distributed manner that they press substantially uniformly and especially at the critical places onto the back side of the individual receiving portions 39 of the punching plate 17. During this punching operation the punched-out insertion labels 29 are positioned in substantially flat fashion on the punching plate 17 by the suction means provided on receiving portions 39. After press bolts 15 have been moved out of the openings 20 of slide 16, the slide is moved along guide bars 25, 26 with the aid of the high-speed drive from the punching position into the discharge position. At the same time, receiving portions 39 slightly move apart in forcibly controlled manner or in electrically or pneumatically controlled manner to arrange the insertion labels 29 at the corresponding heights. The receiving plate 33 of the transfer unit 30 subsequently moves to the respective insertion label 29 and takes it over in a positionally accurate manner in that the suction device of the punching plate 17 is disabled and that of the transfer unit 30 is activated.

The displacement arm 31 of the transfer unit 30 moves into the area of the injection molding machine 2, with pivot head 32 being simultaneously pivoted with insertion labels 29 into the correct position. The receiving head 38 of the insertion unit 35 which is oriented outwardly at this time is preferably already substantially shaped in the form of the mold core. Especially with containers to be made cylindrical or frustoconical, the insertion labels 29 are then moved to the receiving head 38 in tangential fashion. The insertion labels 29 are each fed to the insertion unit 35 with fitting accuracy by activating the suction device of the insertion unit 35 and by disabling the suction device of transfer unit 30.

As can especially be seen in FIG. 2, each insertion label 29 has assigned thereto a pivot head 32 of transfer unit 30 and a receiving head 38 of insertion unit 35.

The mold halves 36 and 37 of tool 34 of the injection molding machine 2 are subsequently opened. The insertion unit 35 pivots into the area between the opened mold cavities 36 and 37 and deposits the insertion labels in the mold cavity with accuracy as to shape in that the labels are again sucked under vacuum into the mold cavity and fed to the insertion unit 35 by deactivating the suction elements. The insertion unit 35 is formed such that the container 40 which was previously produced cyclically is removed from the mold core 41 at the back side of the receiving head 38 at the same time.

During this time slide 16 can again be moved into the punching position with the punching plate 17 so as to punch out new insertion labels.

After the insertion unit 35 has been pivoted out again from the area between mold cavities 36 and 37, tool 34 starts a new injection cycle. The finished containers 40 on insertion unit 35 will then fall downwards into a chute-type collecting means 42 and are then pushed together by a stacking device to form container stacks 44. A new insertion cycle can then be started.

Another embodiment of the present invention shall now be explained with reference to FIGS. 7 and 8. Since this embodiment differs only slightly from the first one, only the differences with respect to the first embodiment shall be regarded and identical reference numerals shall be used for identical or similar components.

Figure 7:
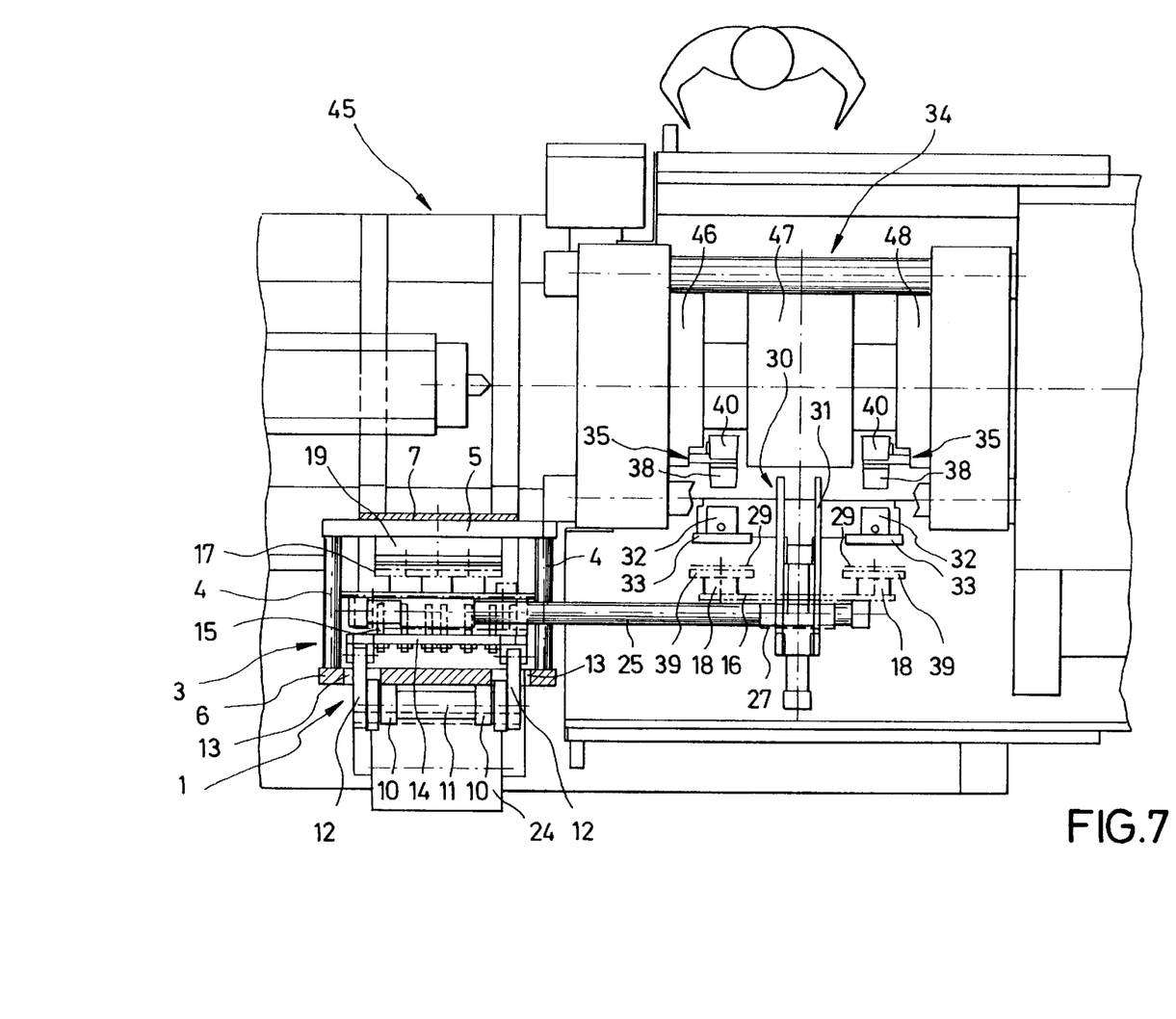
FIG. 7 is a partial top view of an injection molding machine with double tools in another embodiment of the present invention.
Figure 8:
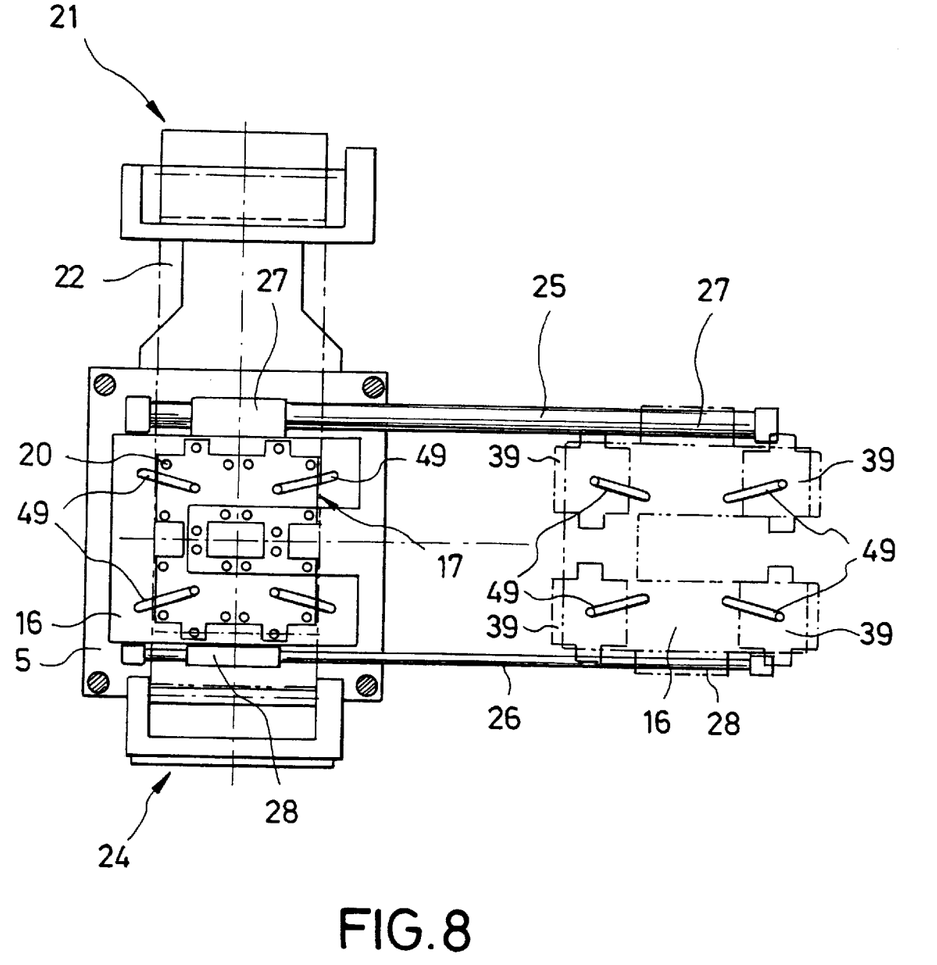
FIG. 8 is a lateral view of the displaceable punching plate structure according to the second embodiment.

The insertion apparatus illustrated in FIGS. 7 and 8 serves to provide insertion labels 29 on a tandem injection molding machine 45 which is characterized by a plurality of sequentially arranged molded parts 46, 47, 48. The corresponding members of the insertion apparatus are matched to the larger dimensions of the tandem injection molding machine 45 and are also slightly larger. The special feature of this machine is that the discharge positions of the individual insertion labels 29 are displaced not only vertically but also laterally relative to one another. To this end the punching plate 17 comprises corresponding guide grooves 39 by which the individual receiving portions 39 of the punching plate 17 can be pushed apart or together in a forcibly controlled manner. In the punching position, the receiving portions 39 are very close to each other so as to save web material 22 as much as possible. By contrast, in the discharge position the receiving portions 39 are moved apart as much as possible, so that the pivot heads 32 of transfer unit 30 which are also spaced apart from one another to a substantial degree need not additionally perform such a movement. Since these machines have two mold planes, the tandem injection molding machine 45 according to this embodiment has twice the number of pivot heads 32 and receiving heads 38.

It goes without saying that the cycle of the insertion apparatus and the injection cycle of the injection molding machine are very accurately clocked with respect to one another. The present invention has the advantage that the insertion labels are exactly positioned due to the fact that they lie flat on the receiving portion 39 of the punching plate 17, so that they can be discharged to the transfer unit 30 and the insertion unit 35 without creases and with accuracy as to shape. During the injection molding process the molten plastic material is then injected into the mold cavity lined with the insertion label and unites therewith in said cavity. The plastic container produced in this way with a generally outwardly applied label printing meets the highest quality demands due to the high precision of the insertion operation without any creases. The cycle number can be increased also thanks to the exact insertion. Furthermore, it is possible with the apparatus according to the invention to provide insertion labels on a plurality of injection molding machines or deep-drawing machines at the same time with a correspondingly re-designed construction.

I claim:

1. A method of providing at least one insertion label on a tool of a plastics processing machine, said insertion label being insertable into a mold half of a tool of said plastics processing machine, comprising the steps of:

punching out said insertion label from a label web material by a punching device which comprises a punching plate and a cutting tool;

transferring said label to said tool of said plastics processing machine after being discharged from said punching device for insertion into said tool;

wherein said punching step comprises the cutting tool acting against the punching plate to cut the insertion labels and holding the insertion label on the punching plate during said punching step;

after said punching step, holding the label with said punching plate, and transversely moving said label with said punching plate to said tool of said plastics processing machine.

2. The method according to claim 1, wherein during the punching step and the transfer to said tool of said plastics processing machine said insertion label is tightly sucked onto said punching plate.

3. The method according to claim 1, wherein said insertion label is transferred with said punching plate to an insertion unit which inserts said insertion labels into and feeds them to a mold half.

4. The method according to claim 1, wherein said insertion label is discharged by a transfer unit from said punching plate and fed to said insertion unit.

5. The method according to claim 4, wherein said insertion label is guided substantially tangentially by said transfer unit to said insertion unit when cylindrical or frustoconcial containers are produced.

6. The method according to claim 1, wherein a plurality of insertion labels are simultaneously punched out and transferred from said punching plate to said tool of said plastics processing machine and discharged to be inserted into said tool.

7. An inserting apparatus for providing at least one insertion label which can be inserted into a mold half of a tool of a plastics processing machine, comprising:

a punching device which comprises a punching plate and a cutting tool and is configured for punching said insertion labels out of a label web material, said cutting tool acting against the punching plate to cut the insertion label;

the punching plate being further provided with holding elements for holding said insertion label during and after a punching step; and means for moving the punching plate in a direction transverse to the punching direction from a cutting position opposite the cutting tool to an insertion position adjacent the tool of said plastics processing machine to transfer said insertion label from the cutting position to the insertion position.

8. The inserting apparatus according to claim 7, wherein said punching plate is arranged on a slide which can be moved back and forth between said punching device and a discharge position near said tool of said plastics processing machine.

9. The inserting apparatus of claim 8, wherein said slide is movably guided on at least two guide bars that are substantially parallel.

10. The inserting apparatus of claim 8, wherein said slide is movable by a strip-type cylinder drive or servo drive.

11. The inserting apparatus according to claim 8, wherein said punching plate is movable in the punching direction against a restoring spring force relative to said slide.

12. The inserting apparatus according to claim 8, wherein said punching device includes an eccentric press or a hydraulic or pneumatic cylinder which exerts force on said punching plate in punching direction at a predetermined time and presses said plate onto said cutting tool.

13. The inserting apparatus according to claim 12, wherein said slide includes openings through which press bolts of said press can be introduced for contact with and movement of said punching plate during the punching operation in the punching direction.

14. The inserting apparatus according to claim 7, wherein said holding elements of said punching plate are formed by suction elements.

15. The inserting apparatus of claim 7, wherein an insertion unit which receives said insertion labels and respectively inserts said labels onto and discharges them to a mold half of said tool is provided in the area of said tool of said plastics processing machine.

16. The inserting apparatus according to claim 15, wherein said insertion unit is formed as a suction-type holding mandrel.

17. The inserting apparatus according to claim 15, wherein a transfer unit which takes over said insertion labels from said punching plate and discharges said labels to said insertion unit substantially with positional accuracy is arranged between said insertion unit and said punching plate in the discharge position thereof.

18. The inserting apparatus according to claim 17, wherein said transfer unit is movably driven substantially in a direction transverse to said punching plate.

19. The inserting apparatus according to claim 17, wherein said transfer unit comprises a pivot head for pivotably receiving said insertion labels.

20. The inserting apparatus according to claim 19, wherein said pivot head includes suction ports.

21. The inserting apparatus according to claim 17, wherein said punching plate comprises a plurality of receiving portions for simultaneously punching and receiving a plurality of insertion labels.

22. The inserting apparatus according to claim 21, wherein said receiving portions are movably arranged relative to one another on a slide, so that they assume their predetermined position during the punching operation and in the discharge position in accordance with said cutting tool and the respectively assigned transfer unit and/or the respectively assigned insertion unit.

* * * * *